United States Patent [19]

Ichinose

[11] Patent Number: 4,612,569

[45] Date of Patent: Sep. 16, 1986

[54] VIDEO EDITING VIEWER

[75] Inventor: Izumi Ichinose, Tokyo, Japan

[73] Assignee: Asaka Co., Ltd., Tokyo, Japan

[21] Appl. No.: 548,231

[22] Filed: Nov. 2, 1983

[30] Foreign Application Priority Data

Jan. 24, 1983 [JP] Japan ................................. 58-10427

[51] Int. Cl.[4] ....................... H04N 5/22; H04N 5/782; H04N 5/87
[52] U.S. Cl. ..................................... 358/22; 358/311; 360/14.1; 369/83
[58] Field of Search ....................... 360/13, 14.1, 14.2, 360/14.3, 72.1, 72.2, 33.1; 358/311, 22, 108, 903; 369/30, 32, 33, 83

[56] References Cited

U.S. PATENT DOCUMENTS 4,538,188 8/1985 Barker et al. ...................... 360/14.3

Primary Examiner—Robert L. Richardson
Attorney, Agent, or Firm—Koda and Androlia

[57] ABSTRACT

A video editing viewer for use in editing a television signal is disclosed. A plurality of frames of the input television signal stored in a memory are repeatedly read-out and a frame picture array is displayed on a screen of a monitor. The frame picture array is moved forwardly or backwardly at any desired speed. Thus a user can see the frame picture array as if he was looking at a cinefilm. A marker is also displayed on the monitor and can be moved along the picture frame array. When a cue button provided on a panel is pushed, a time code of a frame indicated by the marker can be registered as an editing point. Therefore, the editing operation can be effected in an easy and accurate manner.

13 Claims, 7 Drawing Figures

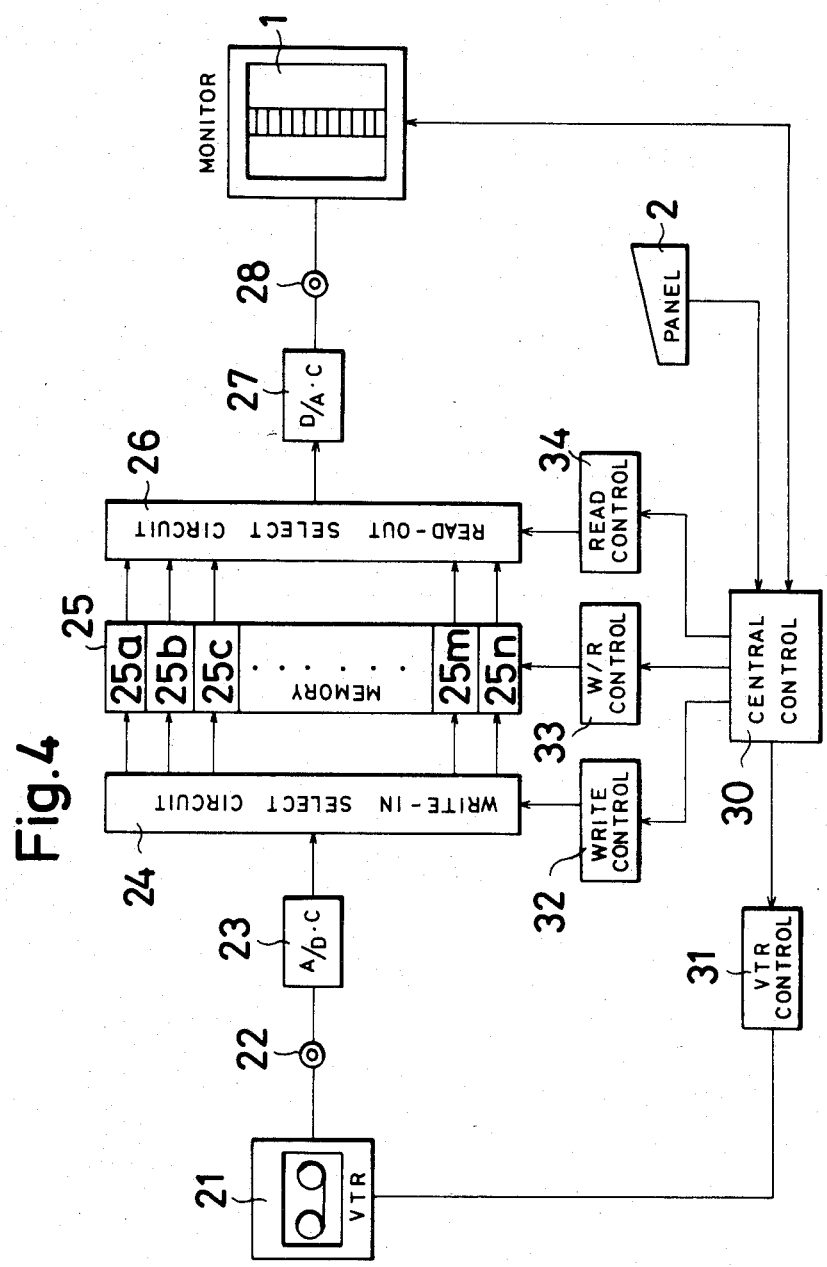

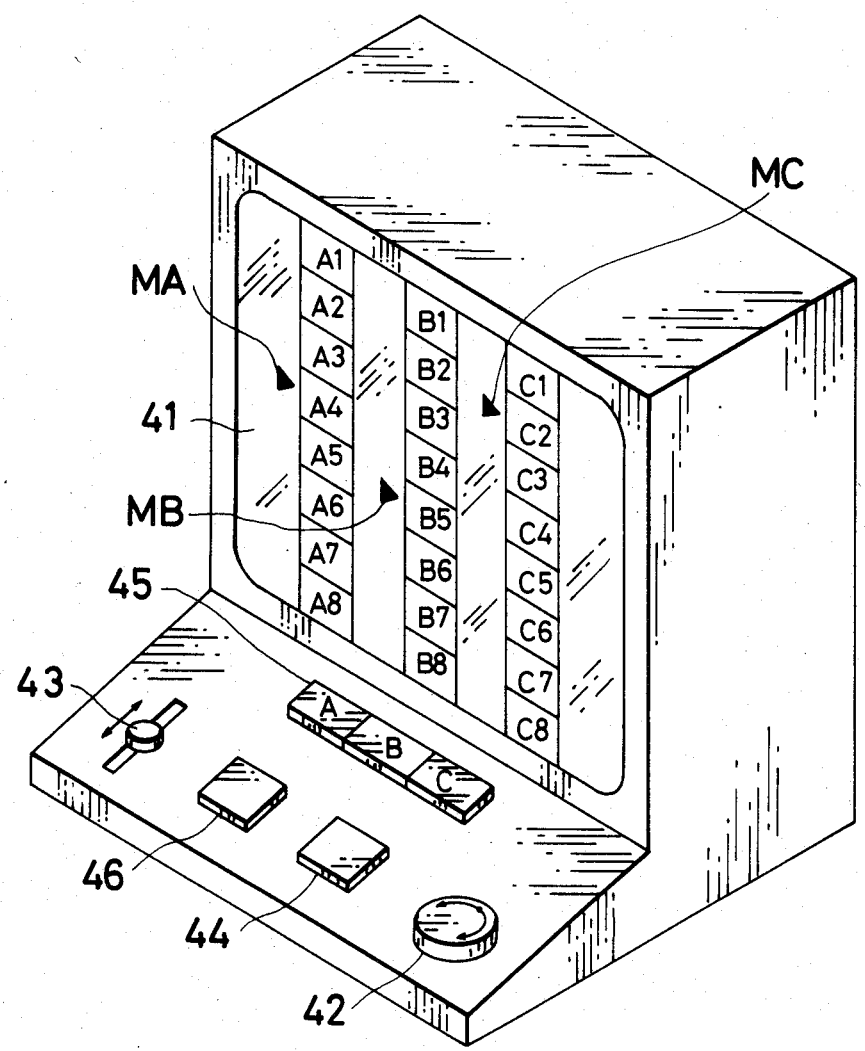

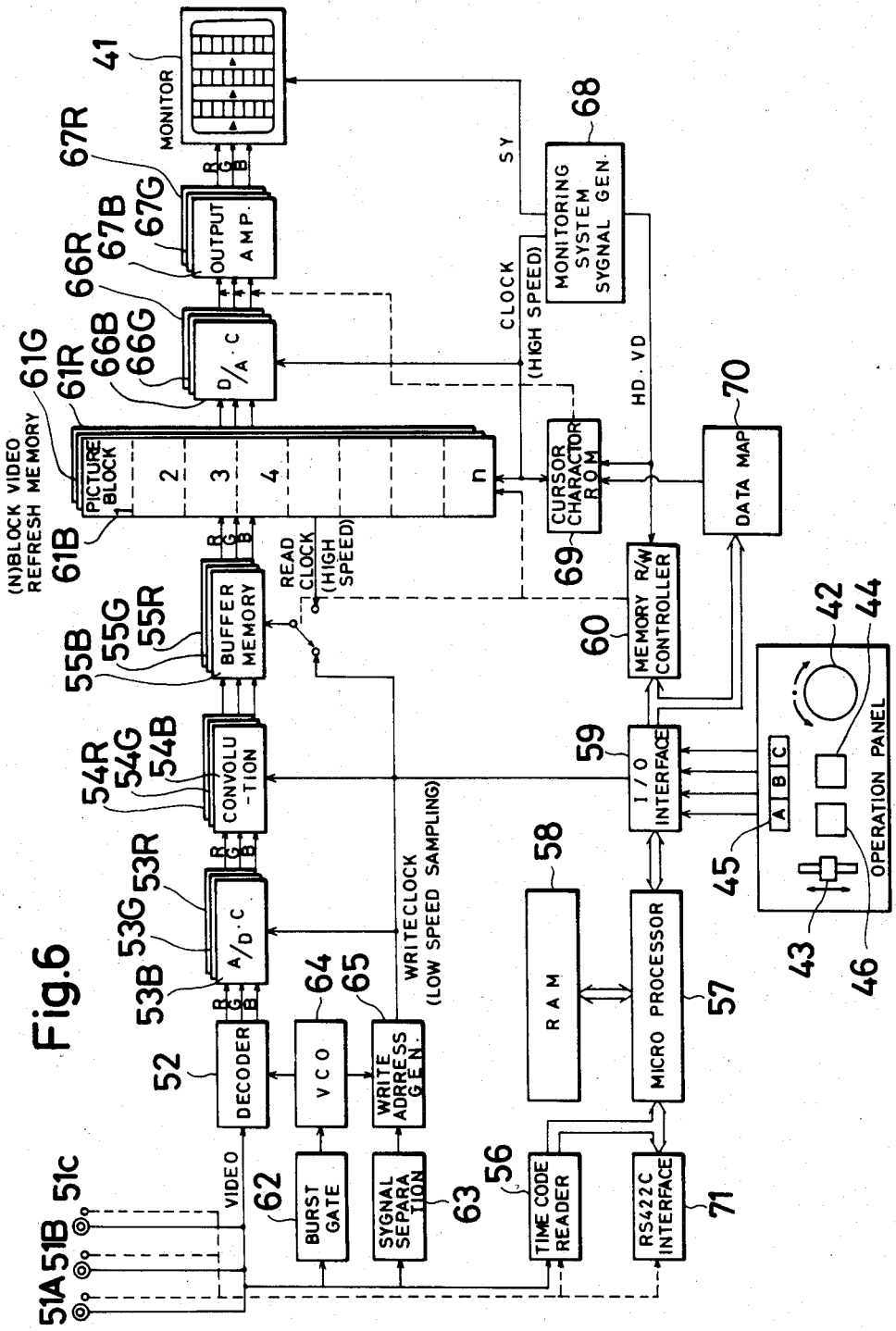

VIDEO EDITING VIEWER

BACKGROUND OF THE INVENTION

The present invention relates to a viewer for use in video editing for displaying simultaneously a plurality of frames of a television signal on a monitor as a continuous frame picture array.

For instance, in a cine film, since successive frames are recorded on the film continuously, an editor can see several to several tens of frames simultaneously within his field of view. Therefore, it is possible to seek and determine desired editing points easily and promptly in accordance with changes in a motion of scenes as in a movie scene and cutting points of frames. Contrary to this, though the television signal is reccorded on a record medium such as video tape and video disc in such a manner that successive frames are recorded on successive tracks, on the monitor there is displayed only one frame. Thus, upon detecting and determining desired editing points, use must be made of an editing machine and the folowing cumbersome operation is required: high speed search—normal reproduction—slow motion reproduction—framewise advance—stop—etc. That is to say, in known video editing apparatus, the editing operation is quite cumbersome.

SUMMARY OF THE INVENTION

The present invention has for its object to provide a viewer for video editing which can remove the above difficulties by displaying on a monitor a plurality of television frames simultaneously and by shifting the displayed frames of the television signal in forward and backward directions at any desired speed, so that a user can have the same effect as viewing a cine film in which successive frames are recorded in the visual form, and thus the user can determine editing points easily and precisely.

According to the present invention, in order to achieve the above object, a viewer for video edition comprises a memory for storing a television signal of a plurality of frames;

a writing-in control circuit for controlling a store of the television signal supplied from a video signal source into the memory;

a reading-out control circuit for reading-out the television signal of a plurality of frames stored in the memory;

a reproduction mode control means for controlling a direction and a speed of writing-in and reading-out operations for the memory by means of said writing-in and reading-out control circuits;

a single monitor for displaying the television signal of a plurality of frames read-out of the memory as a continuous picture on a screen of the monitor; and a means for indicating any frame on the screen as an editing point.

BRIEF DESCRIPTION OF THE DRAWINGS

FIG. 4 is a block diagram illustrating a basic construction of the video editing viewer according to the invention;

FIG. 5 is a perspective view showing still another embodiment of the viewer according to the invention; and FIG. 6 is a block diagram depicting a detailed construction of the viewer shown in FIG. 5.

DESCRIPTION OF THE PREFERRED EMBODIMENTS

Figure 1:
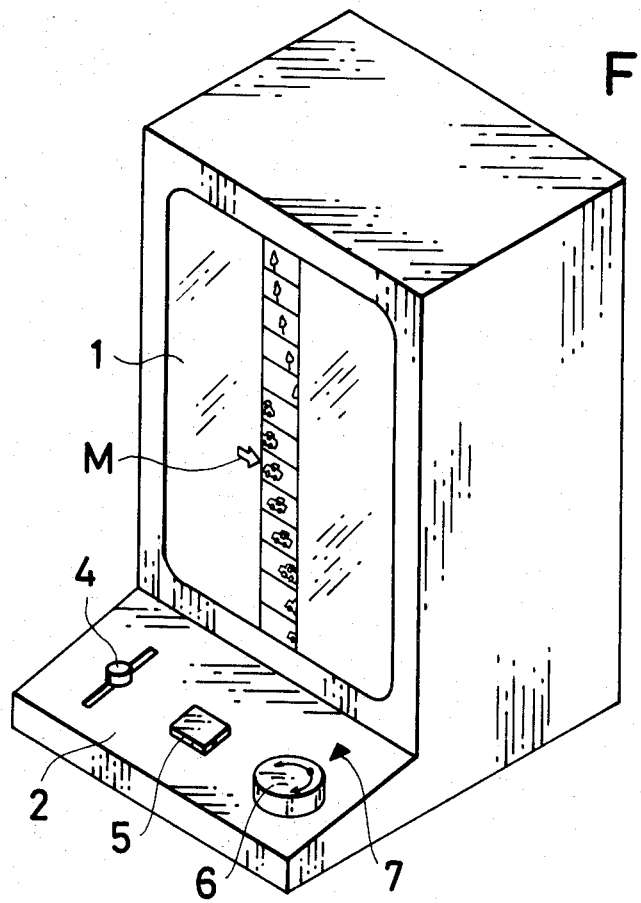
FIG. 1 is a perspective view showing an embodiment of the video editing viewer according to the invention.

FIG. 1 shows an outer appearance of the video editing viewer according to the invention, in which a plurality of successive frames of a television signal are displayed along a vertical line on a screen of a monitor 1. On an operating panel of the monitor 1 are arranged a lever 4 for moving a marker M indicating an editing point on the monitor screen, a cue button 5 for registering a frame indicated by the marker M as an editing point, and a reproduction mode control rotary knob 6 for controlling a movement of the displayed frame picture array at a desired speed and a stop of the movement. On a surface of the rotary knob 6 are recorded an arrow mark and a center mark. When the rotary knob 6 is rotated in the anti-clockwise direction, the frame picture array on the monitor 1 is shifted downwards and its moving speed is made proportional to an angle of rotation of the knob 6. When the knobe is rotated from this position in the clockwise direction, the downward movement of the frame picture array is decelerated and when the center mark is made coincident with the arrow 7, the frame picture array is stopped. When the rotary knob 6 is further rotated in the clockwise direction, the frame picture array is then moved slowly upwards and the speed of this upward movement becomes higher in accordance with the increase in the rotation angle of the rotary knob 6.

Figure 2:
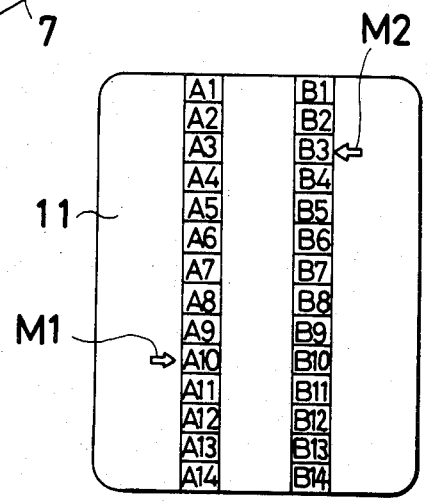
FIG. 2 is a schematic view illustrating an image displayed on a monitor of another embodiment of the video editing viewer according to the invention.

FIG. 2 is a plan view showing a display on the monitor screen of another embodiment of the viewer according to the invention. In this embodiment, two sets of successive frames of television signals supplied from two video signal sources are displayed on a monitor 11 as two frame picture arrays. That is to say, frames A1, A2, ... represent a frame picture array of the television signal supplied from one video signal source and frames B1, B2, ... constitute a frame picture array of the television signal supplied from the other video signal source. These frame picture arrays can be moved independently from each other upwards and downwards at any desired speeds by rotating separate knobs not shown. Moreover, frames of editing points of respective frame picture arrays can be denoted by separate markers M1 and M2 which can be moved independently by means of separate levers not shown. There are further provided two cue buttons for registering frame numbers at editing points. According to the viewer of the present embodiment, a user can effect easily the editing operations such as interchanging the television signals, while comparing the frames of the two video signals from the two video signal sources.

Figure 3A:
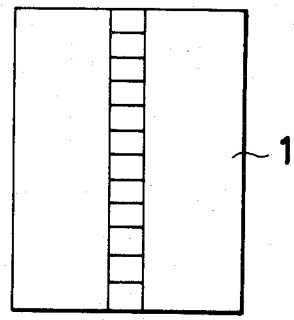
FIGS. 3A and 3B are schematic views showing normal and enlarged images displayed on a monitor of still another embodiment of the viewer according to the invention.
Figure 3B:
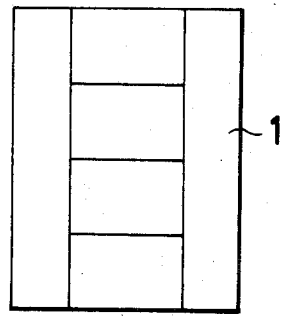

FIG. 3 illustrates a modified embodiment of the video viewer shown in FIG. 2. In the present embodiment, on an operation panel is provided a normal-enlarge exchanging switch. When the switch is driven in a normal side, ten frames are continuously displayed on a monitor as depicted in FIG. 3A, but when the switch is driven in an enlarge side, only four frames are displayed on the monitor with an enlarged scale as shown in FIG. 3B. According to the present embodiment, a rough search for editing is carried out by means of the normal display in which a larger number of frames are displayed and after that a fine search is effected with the enlarge mode and therefore, the editing operation can be effected in a precise and effective manner.

FIG. 4 is a block diagram showing a basic construction of the video editing viewer according to the invention. A video signal supplied from a video signal source 21 such as a video tape recorder (VTR) is supplied to an input terminal 22. The video signal is converted by an A/D converter 23 into a digital signal which is then supplied via a write-in select circuit 24 to a memory 25 and is stored in any one of fourteen frame memories 25a-25n of the memory 25. The number of the frame memories is set to the number of the frames simultaneously displayed on the monitor plus one. For instance, when thirteen frames are to be displayed simultaneously on the monitor, fourteen frame memories are provide in the memory. When the first frame memory 25a is set to a write-in mode to write therein one frame signal of the input video signal, the remaining frame memories 25b-25n are set in a reading-out mode, and a video signal of successive frames in these frame memories is read out continuously under the control of a read-out select circuit 26. The read-out video signal is then converted by a D/A converter 27 into an analog video signal at an output terminal 28 and is supplied to the monitor 1. In order to control the above mentioned VTR 21, write-in select circuit 24, memory 25, reading-out select circuit 26 and monitor 1, there is provided a central control circuit 30. To the central control circuit 30 are connected the lever 4, cue button 5 and rotary knob 6 provided on the operation panel 2. By means of the rotary knob 6, the movement of the frame picture array displayed on the monitor 1 is changed, and to this end a VTR control circuit 31 for controlling the reproduction mode of the VTR 21 is provided. That is to say, when the frame picture array on the monitor 1 is to be moved in the forward direction, the VTR 21 must be driven into a normal reproduction mode, and when the frame picture array is to be shifted in the backward direction, the VTR 21 has to be operated in a reverse reproduction mode. In the former case, the video signal from the VTR 21 is stored in a forward direction into the frame memories 25a, 25b, 25c, ..., 25n, 25a, 25b, . . . . To this end, there is provided a write-in control circuit 32 for controlling the write-in select circuit 24. In order to change the frame memories 25a, 25b, ..., 25n between the write-in mode and read-out mode, there is further arranged a write-in/read-out control circuit 33. Moreover, in case of moving the frame picture array on the monitor 1, the television signal must be read-out of the frame memories 25a, 25b, ... 25n, 25a, 25b, .... For this purpose, there is provided a read-out control circuit 34 for controlling the read-out select circuit 26. It should be noted that the write-in control circuit 32 and read-out control circuit 34 can control the wtiting and reading operations of the frame memories 25a-25n also in the reverse direction. Now it is assumed that the frame picture array on the monitor 1 is to be moved in the forward direction at a speed of one frame per second. The read-out select circuit 26 reads-out the television signal of thirteen frame stored in the frame memories 25b-25n within one frame period of the monitor 1 and displays the read-out television signal for one second. During this one second period, the write-in select circuit 24 operates to store the television signal of a succeeding frame into the frame memory 25a. Next, the read-out select circuit 26 reads-out the frame memories 25c, 25d, ..., 25n, 25a for one frame period and displays the read-out signal for one second. During this time period, a video signal of a next frame is stored in the frame memory 25b. In this manner, by driving the VTR 21 at a rate of one frame pre second in the forward reproduction mode, the frame picture array displayed on the monitor 1 can be moved in the forward direction. On the contrary, when the frame picture array on the monitor 1 is to be moved in the reverse direction, the television signal stored in frame memories 25b-25n is read-out for one frame period and is displayed on the monitor 1 for one second. At the same time, a preceeding frame television signal is written-in the frame memory 25a. After one second, the television signal stored in the frame memories 25a-25m is read-out and a further preceeding frame television signal is stored in the frame memory 25n. In this manner, by operating the VTR 21 in the reverse reproduction mode at the rate of one frame per second, the frame picture array on the monitor 1 can be shifted in the reverse direction at the rate of one frame per second. After the movement of the frame picture array is stopped, the marker M is moved to a desired frame by operating the lever 4 and the cue button 5 is pushed. Then, the editing point has been selected. Address information of the thus selected frame is supplied via the central control circuit 30 to a video editing apparatus not shown and is stored therein. After that, the editing operation is effected by a computer to connect two scenes with each other.

It should be noted that in case of effecting the enlarged display shoun in FIG. 3B, a part of the frame memories of the memory 25 is repeatedly used by means of the writing-in and read-out select circuits 24 and 26 and the enlargement of the numbers of the horizontal and vertical picture elements is carried out.

FIG. 5 is a perspective view showing still another embodiment of the video editing monitor according to the invention. In the present embodiment, on a screen of a monitor 41 are diplayed three frame picture arrays $A_1$, $A_2 \ldots A_8$; $B_1$, $B_2 \ldots B_8$ and $C_1$, $C_2 \ldots C_8$. For each of these frame picture arrays are displayed markers MA, MB and MC, respectively for denoting the editing points. On an operation panel are provided a rotary knob 42 for moving the frame picture array forwardly and backwardly, a lever 43 for moving the markers MA, MB and MC along the frame picture arrays, respectively, a cue button 44 for registering the editing points, a selection switch 45 for selecting an input video signal and a stop button 46 for freezing the video signal in the memory. When the input select button 45 is driven into an input A, the frame picture array $A_1$, $A_2$ ... $A_8$ is selectively moved by operating the rotary knob 42 and the marker MA is moved by sliding the lever 43. When the cue button 44 is pushed, the address data of the frame picture $A_4$ indicated by the marker MA is stored.

FIG. 6 is a block diagram showing a whole contruction of the video editing viewer of the present embodiment. The viewer comprises three input terminals 51A, 51B and 51C and one of them can be selectively connected to the circuit. The input signal may be supplied from a video tape recorder, video disc, etc. and an input line includes a video line for transmitting a video signal and a communication line for transmitting a time code signal, a VTR control signal and various kinds of status information. When the video signal supplied from a VTR connected to the input terminal 51A is selectively processed in the circuit, the remaining video signals have been freezed.

The input color video signal is processed and decoded by a decoder 52 in a usual manner to produce three primary color signals R, G and B. The color signals R, G and B are converted by A/D converters 53R, 53G and 53B for one frame or field into digital color signals which are then subjected to the frequency compression by convolution circuits 54R, 54G and 54B. Then, the frequency compressed color signals are stored in buffer memories 55R, 55G and 55B as one block signal. At the same time from the input video signals are extracted a time code signal by a time code reader 56 and the extracted time code signal is supplied to a micro processor 57 and is stored therein. This newly supplied time code is compared with the time codes of the frames which have been displayed on the monitor 41, said time codes being stored in a RAM 58. Now it is assumed that the first frame picture array $A_1$, $A_2 \ldots A_8$ is to be moved forwardly. Then if the newly supplied time code is detected to be one belonging to a frame $A_9$ to be written-in next, the micro processor 57 drives via an I/O interface 59 a memory read-out/write-in controller 60. Then, the buffer memories 55R, 55G and 55B of one frame are set in a high speed clock mode for the monitor system, and are stored in frame blocks in video refresh memories 61R, 61G and 61B under the control of the read-out/write-in controller 60. In this manner, the display domain for the first video signal A is changed from ($A_1, A_2 \ldots A_8$) to ($A_2, A_3 \ldots A_9$). After that, the read-out/write-in controller 60 is returned to the initial state. The micro processor 57 stores all the time codes of the frames $A_2, A_3 \ldots A_8$ in the RAM 58.

In order to control the decoder 52, A/D converters 53R, 53G, 53B, the convolution circuits 54R, 54G, 54B and buffer memories 55R, 55G, 55B in synchronism with the input video signal, the input video signal is supplied to a burst gate circuit 62 and a synchronizing signal separation circuit 63. A burst signal extracted from the input video signal by the burst gate circuit 62 is supplied to a subcarrier VCO 64 and a subcarrier generated from the VCO 64 is supplied to a write-in address generator 65 to which is also supplied the synchronizing signal from the synchronizing signal separation circuit 63. A write-in clock generated from the write-in address generator 65 is supplied to the A/D converters, convolution circuits and buffer memories as well as to the microprocessor 57 via the I/O interface 59. The decoder 52 is controlled by the subcarrier generated from the VCO 64.

The frame signals stored in the video refresh memories 61R, 61G and 61B are read-out under the control of the read-out/write-in controller 60 and the read-out video signals are converted into analog signals by D/A converters 66R, 66G and 66B. The analog video signals are supplied to the monitor 41 via output amplifiers 67R, 67G and 67B. In order to synchronize the reading-out operation with the monitor 41, there is provided a monitoring system synchronizing signal generator 68.

In order to display the markers MA, MB and MC on the monitor 41, there are provided a cursor-character ROM 69 and a cursor-character data map 70 which is controlled by the micro processor 57 via the I/O interface 59. When the cursors, i.e. markers MA, MB, MC and characters, if any, are to be displayed at desired positions on the monitor 41, code data corresponding to the markers and characters are stored in the data map 70 at positions corresponding to the desired positions on the monitor, the markers and characters can be displayed at will. Since the code data is supplied from the micro processor 57, the display of the markers and characters can be controlled by any program so as to attain a desired object. A position signal of the lever 43 on the operation panel is supplied to the micro processor 57 through the I/O interface 59. Then the micro processor supplies the code to the data map 70 at desired positions. The rotary knob 42, the selection switch 45, the cue switch 44 and the stop button 46 are also conpled with the micro processor 57 via the I/O interface 59 and the signals generated by these function members are supplied to the micro processor 57. For instance, if the selection switch 45 is driven into the first video signal A, the video tape recorder connected to the input terminal 51A is selectively actuated. In such a case, by means of the signal supplied from the rotary knob 42, the relevant video tape recorder is driven into the forward and backward reproduction mode and the pause mode. When the cue button 44 is pushed, the time code of a frame denoted by the marker MA is selected. Further, when the stop button 46 is pushed, the operation of the read-out/write-in controller 60 is stopped to freeze the image on the monitor 41. At the same time, a command signal for rewinding the video tape to the frame denoted by the marker MA is produced. The above mentioned signal are supplied from the micro processor 57 to the video tape recorder through a standard RS 422C high speed serial communication line 71.

In the present embodiment, the input system must be driven with the standard synchronization in accordance with NTSC, PAL, SECAM, etc, but the video refresh memories constituting the output system for producing the display output are not necessarily driven with the same synchronization. Therefore, use may be made of a special television system such as a high resolntion television system of 31.5 kHz in the horizontal direction and 1125 lines in the vertical direction. Then, the definition of the image displayed on the monitor is improved.

It should be noted that the present invention is not limited to the embodiments explained above, but many modifications are conceived within the scope of the invention. For instance, though the number of the frames displayed on the monitor is not changed, but the frame picture array may be moved by several frames at once. In this case, the frame picture array is skipped by several frames at once. Moreover, in order to atain the effect of the movement of the film perforations, a flying mark may be displayed on the monitor together with the frame picture array. Further, the monitor may constitute any display means other than a cathod ray tube. It is a matter of course that any desired information other than the frame picture array and marker may be displayed on the monitor and a sound related to the image displayed on the monitor may be produced, if any. Furthermore, in the above embodiments, the frame picture array is displayed along the vertical direction, it may be displayed along the horizontal direction.

As explained above in detail, according to the video editing viewer of the present invention, on the monitor can be displayed the frame picture array which can be moved in the forward and backward directions at a desiered speed and can be stopped at will, desired editing points can be determined precisely and easily, so that the speed-up and labour work saving in the editing operation can be attained.

What is claimed is:

1. A viewer for video editing comprising:
   a memory for storing a plurality of successive frames of a television signal;
   a writing control circuit for controlling storage of the television signals supplied from a video signal source into the memory;
   a reading control circuit for reading-out the plurality of successive frames of the television signal stored in the memory;
   a reproduction mode control means for controlling a direction and a speed of writing-in and reading-out operations for the memory by means of said writing and reading control circuits;
   a single monitor for simultaneously displaying the plurality of successive frames of the television signal read-out of the memory as a continuous frame picture array on a screen of the single monitor; and
   a means for indicating any frame displayed on the screen as an editing point.

2. A viewer according to claim 1, wherein said reproduction mode control means comprises
   a rotary knob having a neutral position for stopping the movement of the frame picture array, the frame picture array being moved forwardly or backwardly in dependence upon a direction of deviation of the rotary knob from the neutral position at a speed corresponding to an amount of the deviation.

3. A viewer according to claim 2, wherein said indicating means comprises
   circuitry for displaying a marker on the monitor, and
   a lever for moving the marker on the monitor along the frame picture array.

4. A viewer according to claim 3, further comprising
   a cue button for registering any desired frame among the displayed frame picture array denoted by the indicating means.

5. A viewer according to claim 4, wherein said memory has a capacity for storing a plurality of television signals and a plurality of the frame picture arrays are simultaneously displayed on the screen of monitor.

6. A viewer according to claim 1, wherein said reproduction mode control means comprises
   a means for changing the number and size of the frames displayed on the screen of monitor simultaneously.

7. A viewer according to claim 5, wherein said reproduction mode control means further comprises
   a switch for selecting the input video signals.

8. A viewer according to claim 1, wherein said writing control circuit comprises
   a decoder for decoding the color video signal into red, green and blue primary color signals,
   A/D converters for converting the color signals into digital color signals,
   a convolution circuit for frequency-compressing the digital color signals, and
   buffer memories for storing the frequency-compressed digital color signals; and said reading-out control circuit comprises
   D/A converters for converting the digital color signals read-out of the memory into analog color signals, and
   output amplifiers for amplifying the analog color signals.

9. A viewer according to claim 8, wherein said writing-in control circuit further comprises
   a burst gate circuits for extracting a color burst from the video signal,
   a subcarrier generator for generating a subcarrier to be supplied to the decoder,
   a synchronizing signal separation circuit for extracting a synchronizing signal from the video signal, and
   a write-in address generator for generating a write-in clock signal for controlling the A/D converters, convolution circuits and buffer memories.

10. A viewer according to claim 9, wherein said reading-out control circuit further comprises a synchronizing signal generator for producing a synchronizing signal for controlling the D/A converters and the monitor.

11. A viewer according to claim 1, further comprising
    a means for displaying characters on the screen of monitor.

12. A viewer according to claim 1, wherein said reproduction mode control means comprises a means for shifting the frame picture array displayed on the screen of monitor by one frame per unit time.

13. A viewer according to claim 1, wherein said reproduction mode control means comprises a means for shifting the frame picture array displayed on the screen of monitor by a plurality of frames per unit time.

* * * * *